United States Patent Office 3,574,695
Patented Apr. 13, 1971

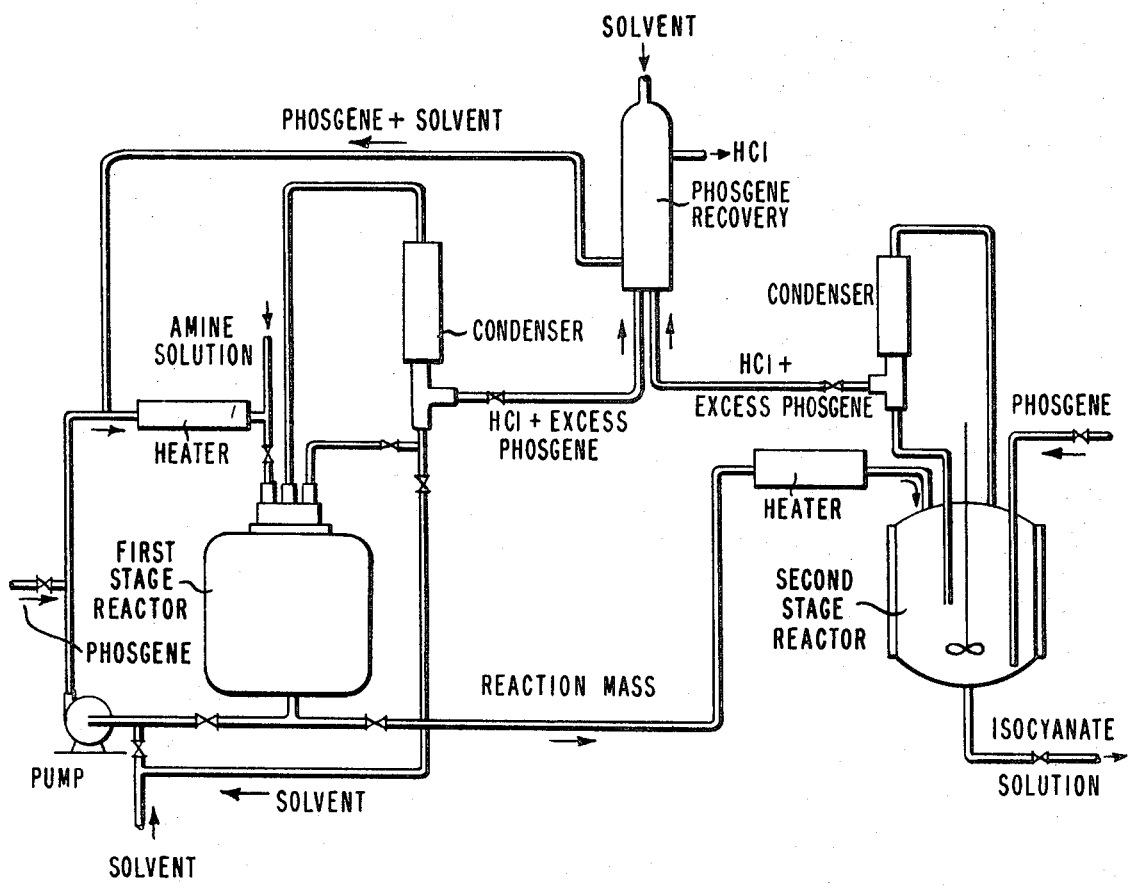

3,574,695
TWO-STAGE PHOSGENATION PROCESS FOR PRODUCING ORGANIC ISOCYANATES
Brenton R. Grant, Jr., Wilmington, and Carl F. Irwin, New Castle, Del., assignors to E. I. du Pont de Nemours and Company, Wilmington, Del.
Filed Apr. 11, 1968, Ser. No. 720,630
Int. Cl. C07c 119/04
U.S. Cl. 260—453    6 Claims

ABSTRACT OF THE DISCLOSURE

In continuous processes for phosgenating organic amines in inert solvents to form isocyanates, hydrochloride persistence and hold times are minimized by continuously contacting in a secondary reaction zone the reaction product from a primary reaction zone with at least 0.75 mole of phosgene per equivalent of organic amine fed to the primary reaction zone, said secondary zone providing an average liquid residence time of about 5 to 45 minutes at at least 130° C., and continuously removing from the secondary zone a gaseous mixture of phosgene and by-product hydrogen chloride and a solution of organic isocyanate.

BACKGROUND OF THE INVENTION

This invention is in the field of phosgenating organic amines to make isocyanates, and in particular 4,4'-methylene-bis(cyclohexylisocyanate).

U.S. Patent 2,822,373 to T. R. Beck discloses the phosgenation of organic primary amines to produce isocyanates in processes, and in particular in continuous flow processes, wherein amine solution is introduced into a large turbulent flow of hot reaction mass consisting of the isocyanate product, phosgene, and by-product HCl dissolved in an inert solvent such as o-dichlorobenzene. Beck cites the beneficial effect of high turbulence in effecting rapid dispersion of the amine and facilitating preferential reaction of the amine with the phosgene. The process he describes also emphasizes the beneficial effect of subsequently flashing the reaction-mass to a lower pressure, and thus removing the HCl generated by the reaction, before recycling the mass, with added phosgene and solvent, to the point of amine introduction.

Beck recognizes that some of the starting amine is converted into amine hydrochloride by reaction with HCl, or alternatively reacts with isocyanates to become converted into ureas and further addition products. These materials are only relatively slowly digested by the phosgene in the reaction mass. Unless converted into isocyanate by digestion under relatively long residence time before being withdrawn with the solution of isocyanate product, these side reaction products lead to a loss of potential yield and can interfere with subsequent process steps. Beck does not suggest how this difficulty can be overcome.

U.S. Patent 3,234,253 to Cooper claims a process in which amine and phosgene are introduced into a relatively small reaction mass, at a relatively low temperature, and the reaction products are held in these conditions for only a relatively short time. The non-isocyanate organic reaction products in the reaction mass are then in a form favoring their conversion to isocyanate in a second reaction operated at high temperature and in which a concentration of HCl in excess of the stoichiometric concentration realizable in the first stage is maintained to facilitate the conversion of ureas to isocyanate.

The processes of the present invention differ from the processes described by Cooper and extend those described by Beck in that they recognize that amine hydrochlorides are the principal non-isocyanate reaction products when the amines are sufficiently well-dispersed in the turbulent hot reaction mass, and that this is particularly the case when the more basic aliphatic, rather than aromatic, amines are being phosgenated. The instant invention recognizes that it is possible, by providing sufficient average hold time in the circulating reaction mass in the Beck process, to ensure an adequate final conversion and a satisfactory yield; however, the productivity of a manufacturing unit employing this process is limited by the need for this extended hold-time making its use undesirable. Also, such extended hold-time increases the formation of by-products, particularly in the case of aliphatic isocyanates. By finding that the digestion of amine hydrochlorides is accelerated by high temperature and by high phosgene concentration the processes of the present invention were devised.

SUMMARY OF THE INVENTION

Now, according to the present invention it has been found that the above-described difficulties of unwanted amine hydrochloride persistence or, alternatively, of excessive hold-times can be overcome economically and with technical advantage by novel processes wherein the desired reaction is effected in a plurality of stages with suitable control of reaction conditions at each stage.

More particularly the present invention is directed to an improvement in a continuous process for the preparation of organic isocyanates by phosgenation of organic amines, which process includes the steps comprising (1) continuously introducing an organic amine, at least 5 parts of an inert organic solvent per part of organic amine, and at least 1.25 moles of phosgene per equivalent of organic amine into a constant composition primary reaction zone providing an average liquid residence time of about from 20 to 120 minutes at a temperature of at least 105° C. and (2) continuously removing from said primary reaction zone a gaseous mixture of phosgene and by-product hydrogen chloride and a liquid reaction mass. The improvement of the invention consists of adding to such processes the steps of (3) continuously contacting in a secondary reaction zone said removed liquid reaction mass with at least 0.75 mole of phosgene per equivalent of organic amine fed to said primary reaction zone, said secondary reaction zone providing an average liquid residence time of about from 5 to 45 minutes at a temperature of at least 130° C. and (4) continuously removing a gaseous mixture of phosgene and by-product hydrogen chloride and a solution of organic isocyanate from said secondary reaction zone.

BRIEF DESCRIPTION OF THE DRAWING

The drawing is a schematic diagram of apparatus for carrying out a process of the invention, indicating also the flow of materials in the process. This shows a first-stage reactor in which there is a primary reaction zone and to which is continuously charged an organic amine, phosgene, and an inert solvent such as o-dichlorobezene. A heater is provided to permit temperature control and a pump to maintain circulation. The reaction mass from the first-stage reactor passes to a second-stage reactor, with heating means again provided. A phosgene recovery unit permits separation and recovery of excess phosgene from the by-product hydrogen chloride from the reactors, and condensers are provided in connection with the reactors to enable refluxing of the inert solvent.

DESCRIPTION OF THE PREFERRED EMBODIMENTS

As above discussed, the first or primary stage of the processes of this invention is already known, being described in Beck United States Patent 2,822,373, issued Feb. 4, 1958. The disclosures of that patent are herein incorporated by reference. In particular, this stage includes the steps identified as (1) and (2) under the above summary of the invention.

The organic amine used as the starting material can be aliphatic, cycloaliphatic, araliphatic, or aromatic, and may be mono- or poly-functional. In general, the processes of this invention are applicable to the manufacture of isocyanates which can normally be prepared by the reaction of amines with phosgene, i.e. the mono-, di-, or polyisocyanates from the corresponding mono-, di-, or polyamines. The processes are particularly applicable to the reaction, with phosgene, of such aromatic amines as aniline; toluidine; benzidine; naphthylamines; 2,4-tolylene diamine; 2,6-tolylene diamine; the phenylene diamines; 4,4'-diamino diphenyl methane; 1,5-naphthalene diamine; 1-amino-3-(4-aminophenyl)propane; anisidine; and chloroanilines. A particularly useful isocyanate is produced when the starting amine is 4,4'-methylenebis(cyclohexylamine). Other amines which give very useful isocyanates include: 1,6-hexamethylene diamine; meta- and para-xylylene diamines; 2- and 4-methyl-1,3-cyclohexylene diamines; 2,4' - methylenebis(cyclohexylamine); 2,2,4 - trimethyl-1,6-hexamethylene diamine; and 3-aminomethyl-3,5,5-trimethylcyclohexylamine.

It will be understood that when we refer herein to "equivalent of organic amine" we mean the number calculated by dividing the molecular weight of the amine by the number of amine groups in the molecule. Also, it will be understood that the organic amine is one which contains no other group than —$NH_2$ which is reactive with phosgene.

The organic solvent used in the primary reaction can be any liquid which is relatively inert towards the amine and phosgene and in which the amine and phosgene are appreciably soluble at the pressures used. Chlorinated aromatic hydrocarbons are thus suitable. It is preferred that the solvent have a lower boiling point than the particular isocyanate which is being prepared in order that the isocyanate will remain dissolved in the solution but can readily be removed therefrom by distillation. The monochlorobenzenes, ortho- and para-dichlorobenzenes, the trichlorobenzenes, the toluenes and xylenes corresponding to each of the foregoing substituted benzenes, chloroethylbenzene, monochlorodiphenyl, and the alpha- and beta-naphthyl chlorides are illustrative of the types of solvent which can be used. Because of its particular boiling point, the o-dichlorobenzene is a preferred solvent.

Because of the continuous and cyclic nature of the novel processes it is important that the constituents of the primary reaction zone be introduced in proper proportions. These proportions should be at least 5 parts of solvent per part of organic amine, and from 1.25 to 2.1 moles of phosgene per equivalent of organic amine. These constituents are introduced into the primary reaction zone at such rates, relative to the rate of reaction mass removal from said zone, as to maintain a substantially constant composition in that zone and to provide an average liquid residence time of about from 20 to 120 minutes. It will be understood that in calculating these proportions the solvent and phosgene from all sources is to be considered, whether added as fresh, pure reagents or returned from a recovery unit for separating excess phosgene from by-product hydrogen chloride. In one preferred embodiment of the invention reactant phosgene and solvent are fed to the primary reaction zone from both of these sources.

The temperature of the primary reaction zone is also important. It must be maintained at at least 105° C. Again owing to the continuous and cyclic nature of the reaction it is necessary not to permit the temperature to go below this point, since otherwise an increase in solid concentration leads to viscosity, making it difficult if not impossible to maintain the recirculation rate or to balance properly the rates of reactant addtion and product withdrawal. The stated 105° C. minimum is satisfactory especially for aromatic amines. For aliphatic and cycloaliphatic amines a minimum temperature of 125° C. is preferable. The maximum temperature of the reaction zone is not critical but advantageously can be 180° C. as disclosed in the above-identified Beck U.S. Patent 2,822,373.

It is, of course, a necessary step of operating the primary reaction to continuously remove from the primary zone a gaseous mixture of phosgene and by-product hydrogen chloride and a liquid reaction mass. The phosgene-hydrogen chloride mixture can go to a phosgene recovery system wherein it is contacted, counter-current, with a solvent for the phosgene only, preferably a chlorinated hydrocarbon and ideally the same solvent as used in the primary reaction zone, e.g. o-dichlorobenzene. The recovered phosgene and solvent can thus go directly to the reaction zone.

The improvement of the present invention consists of continuously conducting the liquid reaction mass, withdrawn from the primary reaction zone, to a secondary reaction zone where it is continuously contacted with at least 0.75 mole of phosgene per equivalent of organic amine fed to the primary reaction zone. This secondary reaction zone should be well agitated; sparging with the phosgene will provide some agitation, but for best results positive, vigorous agitation such as that provided by a high-speed, propeller type agitator should be used. Again, the proportion of phosgene refers to phosgene from all sources, although here most or all of it is added fresh—that is, not associated with solvent.

The temperature in the secondary reaction zone is maintained at least 130° C. This is the minimum temperature for aromatic organic isocyanates. For aliphatic and cycloaliphatic isocyanates a minimum temperature of 150° C. is preferred at this stage. Again the maximum temperature advantageously may be 180° C.

A gaseous mixture of phosgene and by-product hydrogen chloride and a solution of the desired organic isocyanate in the original inert organic solvent are continuously removed from the secondary reaction zone, the latter at such a rate, relative to the rate of liquid reaction mass fed from the primary reaction zone, that the average liquid residence time is about from 5 to 45 minutes. The phosgene-hydrogen chloride mixture advantageously can be fed to a phosgene recovery unit as above described. The desired organic isocyanate can be recovered by such known techniques as distilling off the solvent, and can be purified, if desired, by conventional methods.

The efficacy of the secondary reaction zone is enhanced by operation at superatmospheric pressures—say up to 5 atmospheres absolute, and by feeding enough phosgene into it to maintain a partial pressure of $COCl_2$ over the reaction mass of at least 6 p.s.i.a. This pressure corresponds to complete conversion at 130° C. in the second stage of 25% of the original organic amine theoretically surviving a 75% conversion in the primary reaction zone. A partial pressure of 6 p.s.i.a. phosgene represents $COCl_2/HCl=1.0$, with 1 atmosphere total reactor pressure and solvent partial pressure of about 150 mm.

It will be understood that the present invention contemplates at least a second reaction zone, operated as indicated above, and that similar, additional reaction zones are not precluded. However, most of the advantages of the invention can be achieved in the two-stage reaction as above described. These advantages derive mainly from decreased hold times in the primary reaction zone and the resultant increase in through-put for a given capacity of equipment.

The invention will be better understood by reference to the following illustrative example.

EXAMPLE

In apparatus arranged as in the drawing, a reaction mass at 160° C. containing 6% by weight of 4,4'-methylenebis(cyclohexylisocyanate) is circulated through the first-stage reactor at the rate of 2000 parts per hour. The corresponding amine [4,4'-methylenebis(cyclohexyl amine)] is fed into the loop at a rate of 1 part per hour, and solvent o-dichlorobenzene is fed into the loop at a rate sufficient to maintain the 6% isocyanate concentration in the reaction mass.

Unreacted phosgene and by-product hydrogen chloride at a total pressure of about 2 p.s.i.g. leave the reservoir, and o-dichlorobenzene solvent vapors carried with them are condensed and returned to the circulation loop. The phosgene concentration in the off-gas leaving the condenser is about 35 volume percent. In order to maintain this composition for the off-gas, phosgene is introduced into the circulating loop upstream of the point of amine addition at a rate approaching 1.9 parts per hour. The total liquid volume of the first stage provides an average residence time of about 75 minutes for the reaction mass.

The liquid reaction mass withdrawn from the first-stage reactor contains, in addition to the 6% 4,4'-methylenebis(cyclohexyl isocyanate), about 0.05 wt. percent of filterable solids, identifiable as the hydrochloride of the starting amine. This reaction mass is withdrawn from the first stage and fed to the second stage vessel, at a rate sufficient to hold the level in the first.

The second-stage reactor is a well agitated vessel fitted as shown in the drawing. Fresh phosgene is fed to a sparger beneath the agitator in this vessel, at a rate of 1.06 parts per hour. The pressure of the off-gas in the reactor is maintained at 20 p.s.i.g., and again solvent vapors carried with the off-gas are condensed and returned to the reactor. The temperature is maintained at about 165° C. Phosgene concentration in the off-gas is about 60 volume percent. The volume of material in this reactor is sufficient to provide an average residence time of 12 minutes for the liquid reaction mass. Isocyanate product solution withdrawn from this second stage contains 6.4 wt. percent 4,4'-methylenebis(cyclohexylisocyanate) and less than 0.005 wt. percent filterable solids. Following distillation to remove first residual

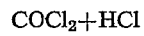

$$COCl_2 + HCl$$

then solvent o-dichlorobenzene, a sample analyzed by analytical distillation is found to have a ratio of 4,4'-methylenebis(cyclohexylisocyanate) to undistillable residue greater than 20. This corresponds to a chemical yield greater than 95%, based on the amine.

Distillation of solvent-free crude diisocyanate by two passes in a wiped film still, first to remove low boilers and color formers and then to separate high-boilers, yields a product having an —NCO content greater than 31.8% (theoretical is 32.04) and containing less than 0.4 wt. percent monoisocyanate impurity.

We claim:

1. In a continuous process for the preparation of organic isocyanates, which includes the steps comprising (1) continuously introducing an aliphatic, cycloaliphatic, araliphatic or aromatic organic amine, which contains no other group than —$NH_2$ which is reactive with phosgene, at least 5 parts of an inert organic solvent per part of organic amine, and from 1.25 to 2.1 moles of phosgene per equivalent of organic amine into a primary reaction zone providing an average liquid residence time of about from 20 to 120 minutes at a temperature of from 105 to 180° C., and (2) continuously removing from said primary reaction zone a gaseous mixture of phosgene and by-product hydrogen chloride and a liquid reaction mass, the rate of introduction of constituents in Step (1) relative to the rate of removal of products in Step (2) being such as to maintain a substantially constant composition in the primary reaction zone, the improvement consisting of (3) continuously contacting in a secondary reaction zone, said removed liquid reaction mass with from 0.75 to 2.1 moles of phosgene per equivalent of organic amine fed to said primary reaction zone, said secondary reaction zone providing an average liquid residence time of from 5 to 45 minutes at a temperature of from 130 to 180° C., and (4) continuously removing a gaseous mixture of phosgene and by-product hydrogen chloride and a solution of organic isocyanate from said secondary reaction zone.

2. A process of claim 1 in which the inert organic solvent is a chlorinated aromatic hydrocarbon.

3. A process of claim 1 in which the inert organic solvent is o-dichlorobenzene.

4. A process of claim 1 in which the organic amine is selected from the group consisting of aliphatic and cycloaliphatic amines, the temperature in the primary reaction zone is maintained at at least 125° C. and in the secondary reaction zone at at least 150° C.

5. A process of claim 4 in which the organic amine is 4,4'-methylenebis(cyclohexylamine).

6. A process of claim 1 wherein excess phosgene from at least one of the reaction zones is separated from by-product hydrogen chloride by extracting the phosgene in an additional quantity of the same solvent as used in the reaction zones, and said extracted phosgene is returned for use in the primary reaction zone.

References Cited

UNITED STATES PATENTS

| | | | |
|---|---|---|---|
| 2,683,160 | 7/1954 | Irwin | 260—453 |
| 2,822,373 | 2/1958 | Beck | 260—453 |
| 2,908,703 | 10/1959 | Latourette | 260—453 |
| 3,234,253 | 2/1966 | Cooper | 260—453 |
| 3,287,387 | 11/1966 | Denton et al. | 260—453 |
| 3,465,021 | 9/1969 | Nicholas et al. | 260—453 |

CHARLES B. PARKER, Primary Examiner

D. H. TORRENCE, Assistant Examiner